(12) United States Patent  
Conn et al.

(10) Patent No.: US 9,122,972 B2  
(45) Date of Patent: Sep. 1, 2015

(54) CARD HOLDER DEVICE

(75) Inventors: Joseph D. Conn, St. Louis, MO (US); Atha Jamar Neal, III, St. Louis, MO (US)

(73) Assignee: J.D. CONN, INC., St. Louis, MO (US)

( * ) Notice: Subject to any disclaimer, the term of this patent is extended or adjusted under 35 U.S.C. 154(b) by 531 days.

(21) Appl. No.: 13/031,025

(22) Filed: Feb. 18, 2011

(65) Prior Publication Data

US 2011/0198396 A1 Aug. 18, 2011

Related U.S. Application Data

(60) Provisional application No. 61/305,841, filed on Feb. 18, 2010.

(51) Int. Cl.  
G06K 5/00 (2006.01)  
G06K 13/14 (2006.01)  
G06K 13/08 (2006.01)  
G06K 17/00 (2006.01)

(52) U.S. Cl.  
CPC ............ G06K 13/14 (2013.01); G06K 13/0843 (2013.01); G06K 17/0003 (2013.01)

(58) Field of Classification Search  
USPC ......................................................... 235/380  
See application file for complete search history.

(56) References Cited

U.S. PATENT DOCUMENTS

| | | | |
|---|---|---|---|
| 4,412,631 A | 11/1983 | Haker | |
| 4,519,522 A | 5/1985 | McElwee | |
| 4,867,628 A | 9/1989 | Ammon et al. | |
| 5,042,686 A * | 8/1991 | Stucki | 221/13 |
| 5,206,488 A | 4/1993 | Teicher | |
| 5,344,042 A | 9/1994 | Crosby et al. | |
| 5,499,707 A * | 3/1996 | Steury | 194/217 |
| 5,533,632 A | 7/1996 | Patterson et al. | |
| 6,014,648 A | 1/2000 | Brennan | |
| 6,273,277 B1 | 8/2001 | Geldenhuys | |
| 6,340,094 B1 | 1/2002 | Kawamura | |
| 6,587,748 B2 | 7/2003 | Baack | |
| 2007/0152039 A1* | 7/2007 | Bychkov et al. | 235/381 |
| 2009/0187271 A1 | 7/2009 | Heinlein et al. | |
| 2010/0325001 A1* | 12/2010 | Barber et al. | 705/17 |

* cited by examiner

Primary Examiner — Rafferty Kelly  
(74) Attorney, Agent, or Firm — Polsinelli PC

(57) ABSTRACT

A card storage device for storing payment cards, such as credit and debit cards or other media in an orderly fashion. The device may be used at a food and/or drink establishment. The device securely stores a number of cards for a number of patrons who wish to open a tab at a bar, pub, restaurant, or other service environment.

20 Claims, 12 Drawing Sheets

CARD HOLDER DEVICE

RELATED APPLICATIONS

This application takes priority to U.S. Provisional Patent Application No. 61/305,841 filed Feb. 18, 2010 and entitled Card Holder Device, the entire contents of which is incorporated herein by reference.

BACKGROUND

Many commercial establishments provide their customers or patrons the opportunity to open an informal service or credit account. For customers or patrons of establishments, such as restaurants, bars, taverns, pubs, or other providers of goods and/or services, these informal and often temporary accounts are commonly known as a tab. Many patrons do not want to take the time to pay for each item or beverage, when they intend to purchase more than one.

To open a tab, the patron will provide the establishment with a payment card as collateral or as a means for payment. Often times the bartender or server will maintain a disorganized collection of payment cards. It is often difficult to locate a particular card in dimly light establishments. In addition, the collection of payment cards is often left unattended and unsecured. Therefore, devices and methods are needed to securely store and retrieve the payment cards in an orderly manner.

SUMMARY

A card holder device and method are provided for storing and retrieving cards in a secure and orderly manner. In one aspect, the device includes a main housing defining an opening to receive at least one card, a storage mechanism having at least one storage area to store the at least one card, a card reader device to acquire data from the at least one card, and a card holder system. The card holder system includes a processor, memory, and a card storage application executed by the processor. The card storage application communicates with the card reader device to store, in memory, the data acquired from the at least one card stored in the storage area. The card storage application also controls operation of the storage mechanism for storage of the at least one card in response to a storage request and controls operation of the storage mechanism for retrieval of the at least one card in response to a retrieval request.

In another aspect, the card holder device includes a cylindrical housing defining an opening in a top surface of the cylindrical housing to receive at least one card inserted therein, the card holder device includes a transportation mechanism that includes at least one roller to engage the at least one card received at the opening. The transportation mechanism advances the at least one card into the cylindrical housing in response to a storage request and advances the at least one card out of the cylindrical housing in response to a retrieval request. The card holder device includes a storage mechanism having at least one storage area to receive the at least one card from the transportation mechanism and to store the at least one card in a particular storage area.

The card holder device also includes a card reader device to acquire data from the at least one card, and a card holder system that includes a processor, memory and a card storage application executed by the processor. The card storage application communicates with the card reader device to store, in memory, the data acquired from the at least one card, where the data is further associated with the particular storage area. The card storage application controls operation of the storage mechanism for storage of the at least one card in the particular storage area in response to the storage request, and controls operation of the storage mechanism for retrieval of the at least one card from the particular storage area in response to the retrieval request.

A method for using the device to store and retrieve cards is also provided. In one aspect, the method includes inserting a card into a card holder device. Data is captured from the card and associated with the card. The method also includes transporting the card to a storage mechanism and storing the card. When the card no longer needs to be stored, the method further includes retrieving the card from the card holder device.

DETAILED DESCRIPTION

The cardholder device and methods disclosed herein provide a means to store and retrieve a business card, an identification card, or a payment card, among others, in a secure and organized manner. For example, the card holder device may be locked to prevent unauthorized access to the cards stored therein. The card holder device may be useful at an eating or drinking establishment (e.g., a bar, pub, or restaurant), where a patron wishes to open a tab or credit line and not pay for each individual item. For example, a service provider, such as a member of the wait staff, a bartender, or a busboy, may use the card holder device to securely store the payment card provided by the patron. The card holder device also allows the bartender to keep a tally of the charges occurred by the patron.

Figure 1:
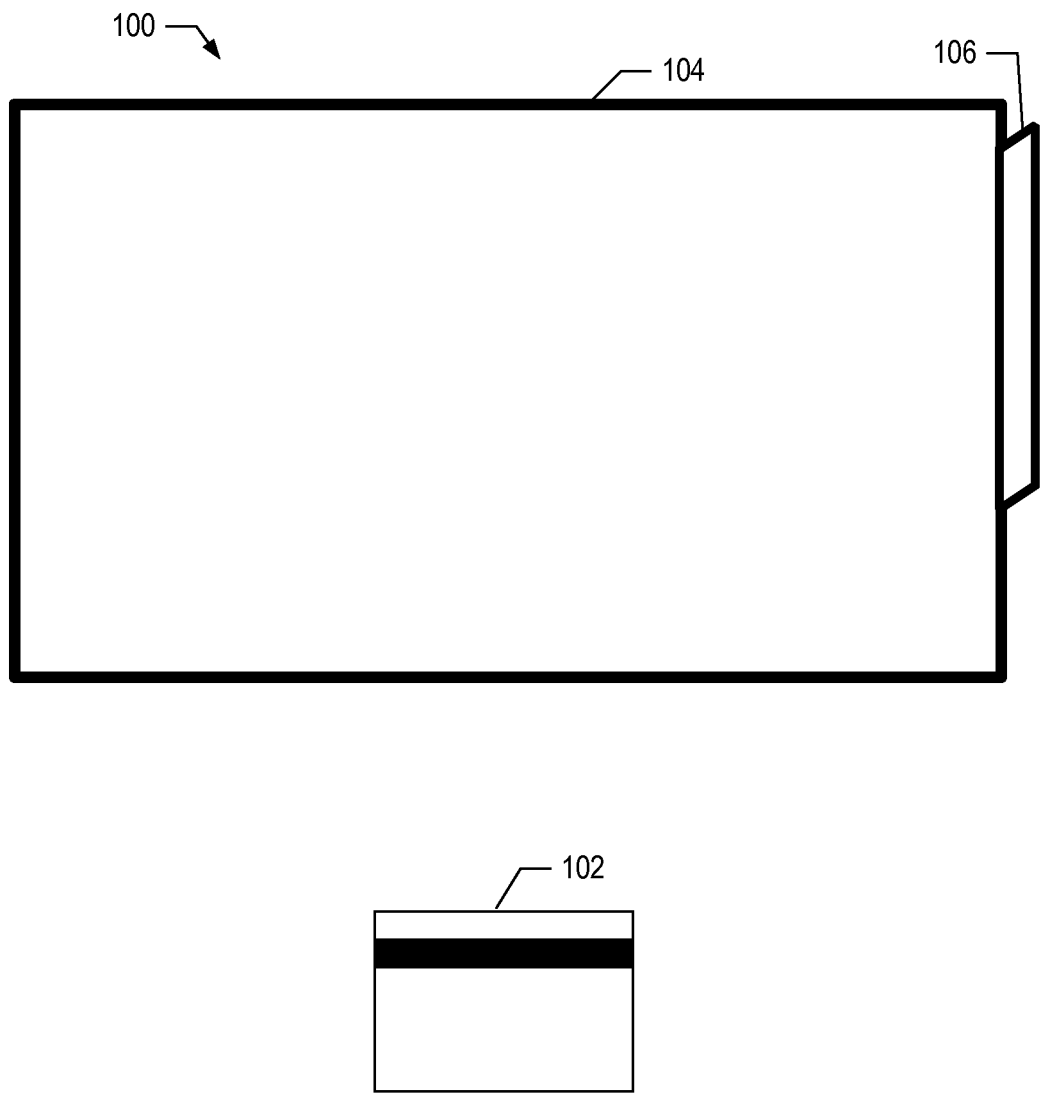
FIG. 1 is a side view of an aspect of the card holder device.
Figure 2:
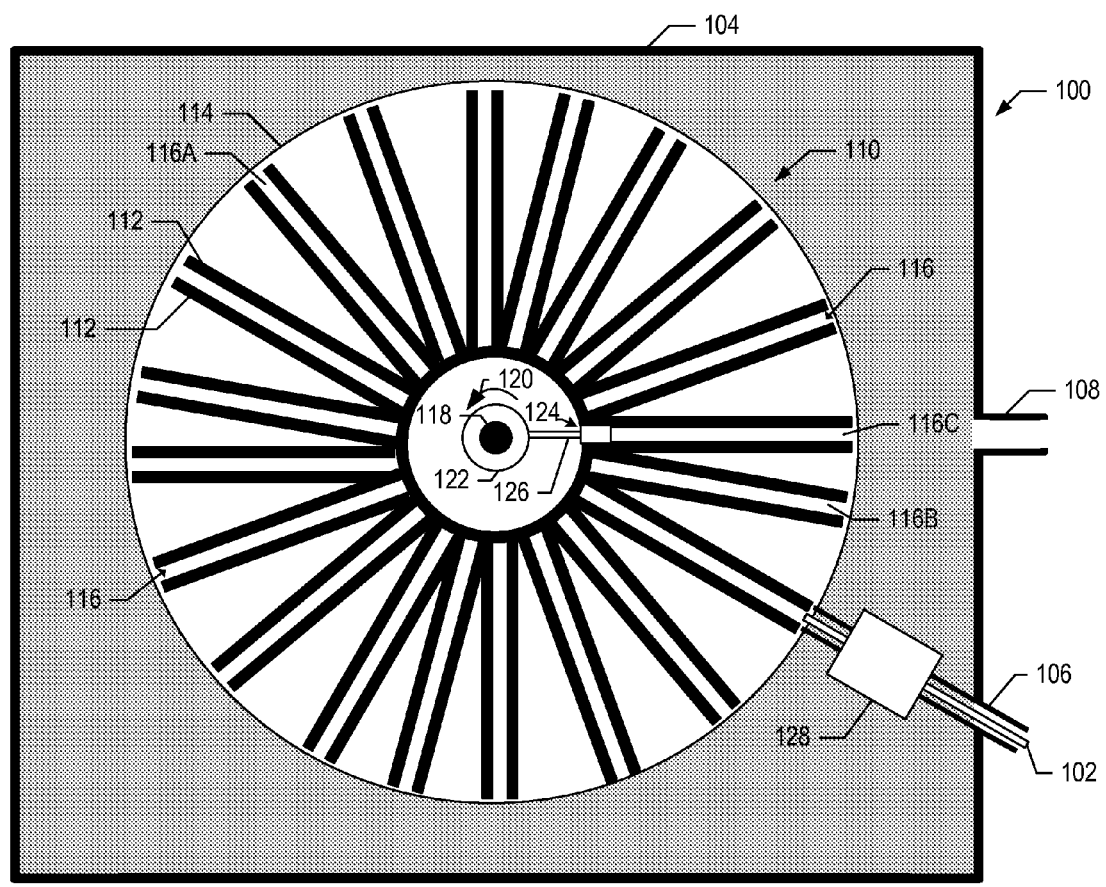
FIG. 2 is a top-view of the interior of an aspect of the card holder device.

FIGS. 1-2 are a side-view and a top-view, respectively, of an exemplary embodiment of the card holder device 100. In one aspect, the card holder device 100 stores and retrieves a card 102, (e.g. a magnetic stripe card) provided by a patron. By way of example and not limitation, the card 102 may be a payment card, a stored cash value card, an identification card, or any other card that stores information in a readable magnetic strip. In another aspect, the card 102 does not include a magnetic strip and may be a card that includes text or graphics. For example, the card 102 is a business card or an index card.

According to one aspect, the card holder device 100 includes a main housing 104. The main housing may be a cube, another polygon, or cylindrical in shape. Other configurations may be used. The card holder device 100 includes an insertion slot or opening 106 for inserting the card 102 into the card holder device 100 and a retrieval opening 108 for retrieving the card 102 from the card holder device 100. In another aspect, a single opening may be used to insert and/or retrieve the card 102. In yet another aspect, a number of openings may be used to insert and/or retrieve the card 102. The card 102 may be inserted, stored, and retrieved in any orientation. For example, when the card 102 is rectangular, it may be inserted, stored, and/or retrieved where the longer dimension is in a horizontal or vertical orientation The card holder device 100 includes a storage mechanism 110 that has one or more storage areas to store the card 102 within the card holder device 100. According to one aspect, the storage mechanism 110 is a carousel that includes a number of vertically oriented fins 112 arranged radially around a hub 118. The fins 112 are connected to the surface of a disk 114, creating a number of dividers. The fins 112 divide the surface of the disk 114 into a number of storage areas 116, including, for example, storage areas 116A, 116B, and 116C. Although the storage areas 116 are depicted as being rectangular, other shapes and configurations for the storage areas may be used.

The storage areas 116 are aligned radially around the disk 114. Each storage area 116A-C is used to store a particular card. For example, after insertion into the card holder device 100, the card 102 may be held in the storage area 116B of the storage mechanism 110.

In one aspect, the storage mechanism 110 is configured to rotate about an axis 118, as indicated by 120. The storage mechanism 110 may be rotated manually or by a motor. The motor may be a stepper motor 122 or a digital drive motor that operates such that the rotation of the storage mechanism 110 can be controlled and monitored, thus allowing the position of each fin 112 and/or storage area 116 to be identified or located as the storage mechanism 110 rotates. For example, a stepper motor 122 rotates the storage mechanism 110 about the axis 118 in a step-wise manner. In other examples, the stepper motor 122 is coupled with an integral encoder.

In another aspect, the stepper motor 122 rotates the fins 112 so that one of storage areas is aligned with the insertion opening 106 and/or the retrieval opening 108. For example, the insertion opening 106 and the retrieval opening 108 may be positioned such that the storage area 116B is aligned with the insertion opening 106 while the storage area 116C is simultaneously aligned with the retrieval opening 108.

According to another aspect, the storage mechanism 110 is automatically rotated about the axis 118 to a default position where an empty storage area (e.g., the storage area 116B) is aligned with the insertion opening 106 when the card holder device 100 is not in use for a predetermined amount of time. In this aspect, the storage mechanism 110 can more quickly and efficiently store the card 102 when inserted into the card holding device 100. In another aspect, the storage mechanism 110 rotates about the axis 118 to a default position in response to a user input.

Although the storage mechanism 110 is shown as cylindrical in shape, in other embodiments the storage mechanism 110 may be rectangular or another shape, including but not limited to being generally circular, square, or oval. According to other aspects, the storage mechanism 110 may include a number of horizontally and/or vertically arranged shelves and/or platforms. Other configurations exist.

According to one aspect, the storage mechanism 110 is operatively associated with an ejection mechanism 124. The ejection mechanism 124 aids in the retrieval of the card 102 from an occupied storage area.

In one aspect, the ejection mechanism 124 includes a push bar 126 that extends outward from the hub 118 through the occupied storage area which may be aligned with the card retrieval opening 108. In this aspect, the card 102 held in the occupied storage area 116 is pushed out of the storage mechanism 110 and out of the card holder device 100 through the retrieval opening 108.

According to one aspect of the card holder device 100, the insertion opening 106 and the retrieval opening 108 are associated with a transportation mechanism 128. The transportation mechanism 128 transports cards into, out of, and within the card holder device 100.

In one aspect, the transportation mechanism 128 operatively engages the card 102 and transports the card 102 from the insertion opening 106 to the storage mechanism 110. The transportation mechanism 128 also places the card 102 into a particular one of the storage areas 116 of the storage mechanism 110.

According to another aspect, the transportation mechanism 128 also functions to retrieve the card 102 from the storage mechanism 110. In this aspect, the transportation mechanism 128 operatively engages the card 102 that is stored within the storage mechanism 110 and transports the card 102 to the retrieval opening 108.

According to another aspect, the transportation mechanism 128 operates in conjunction with the ejection mechanism 124 to retrieve the card 102 from the storage mechanism 110. For example, the push bar 124 of the ejection mechanism 124 pushes at least a portion of the card 102 out of the occupied storage area. The transportation mechanism 128 then engages the card 102 and transports the card 102 to the retrieval opening 106 so that the card 102 can be removed from the card holder device 100.

In one aspect, the operation of the transportation mechanism 128 is controlled by an input received at the card holder device 100 from a user of the card holder device 100. In another aspect, the operation of the transportation mechanism 128 is controlled by an input received at a computing device (not shown) that is communicatively connected to the card holder device 100.

According to another aspect, the transportation mechanism 128 is connected to a card detecting mechanism (not shown) that detects when a card has been inserted into the insertion opening 106. For example, when the card 102 is inserted in the insertion opening 106, the card detecting mechanism initiates the operation of the transportation mechanism 128. After the card 102 has traversed the insertion opening 106, the card detecting mechanism may detect that the entire card has been received into the card holder device 100 and cease the operation of the transportation mechanism 128.

In one aspect, the card detecting mechanism is an optical sensor. For example, the optical sensor may include a transmitter for generating an optical signal and a receiver, for receiving the optical signal. According to one aspect, the transmitter and receiver are located on opposing sides near the insertion opening 106, such that the card 102 travels between the transmitter and the receiver when inserted into the insertion opening 106. In another example, the optical sensor may be composed of a transmitter/receiver portion and a reflector portion. In these examples, the card 102 obstructs the optical signal when inserted in to the insertion opening 106 so that the optical signal is not received at the receiver. In response to the obstruction of the signal, the card detecting mechanism initiates the operation of the transportation mechanism 128. Once the optical signal is again received at the receiver, the operation of the transportation mechanism 128 is concluded. Other card detecting mechanisms may be used. By way of example and not limitation, the other card detecting mechanisms may include a spring-loaded switch that is depressed by the card 102 when inserted.

Figure 3A:
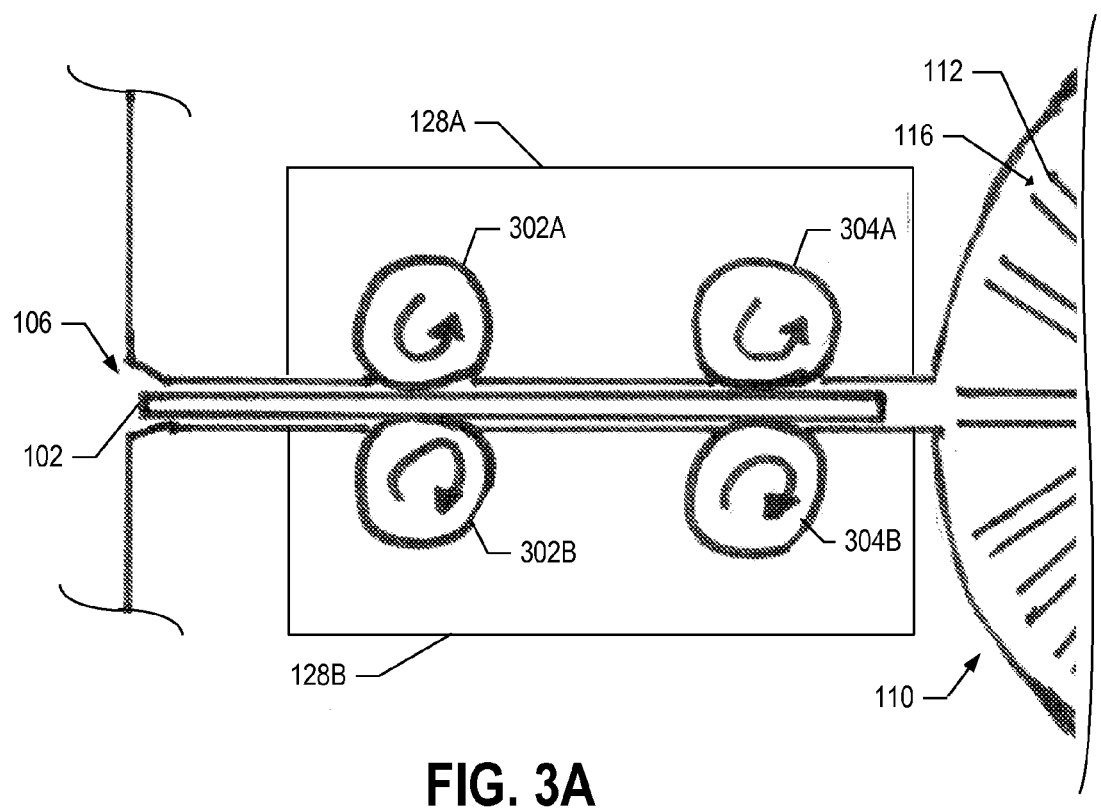
FIGS. 3A-B depict exemplary transportation mechanisms for the card holder device.
Figure 3B:
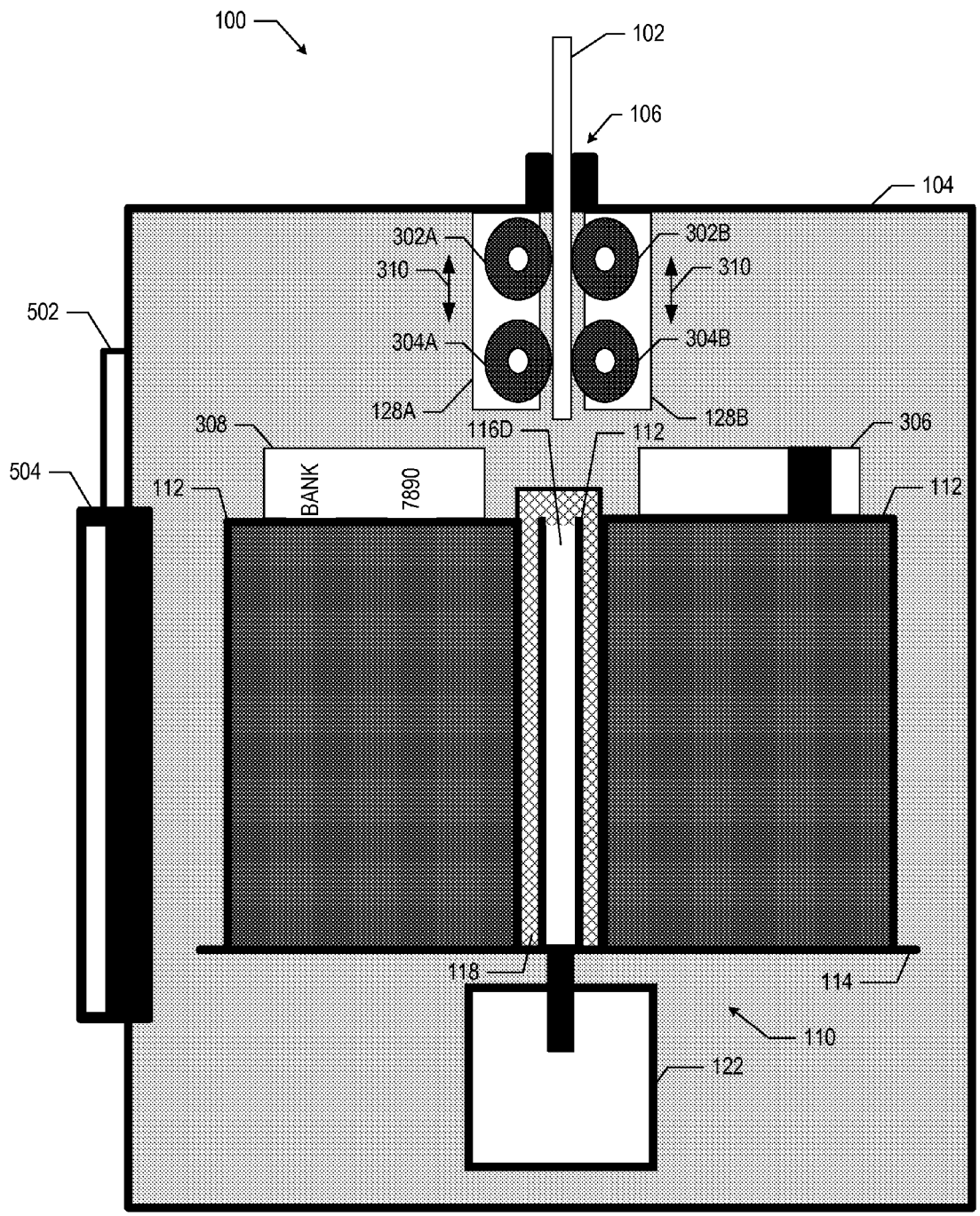

FIGS. 3A-B depict exemplary transportation mechanisms 128A-B for the card holder device 100. In this example, the transportation mechanisms 128A-B use a number of motor-driven rollers, arranged in pairs of counter-rotating rollers 302A-B and 304A-B to operatively engage the card 102. According to one aspect, the transportation mechanism 128 of the card holder device 100 is a roller driven device, such as those commonly used in an Automated Teller Machine (ATM). For example, an ATM device pulls a card, such as the card 102 into a series of rollers aligned along opposite sides of the card.

Although two pairs of counter-rotating rollers 302A-B, 304A-B are shown, any number of rollers may be used. According to one aspect, the transportation mechanism 126 includes a single roller that operatively engages the card 102. Other configurations may be used. By way of example, and not limitation, the rollers may be cylindrical or spherical.

As shown in FIG. 3A, the transportation mechanisms 128A-B provide the card 102 to the storage mechanism 110 along a path that extends through diameter of the storage mechanism. In another aspect shown in FIG. 3B, the transportation mechanisms 128A-B provide the card 102 to the storage mechanism 110 along a path that is perpendicular to the surface of a disk 114. In various other aspects, the card 102 may be moved to the storage mechanism along other paths.

In one aspect, the fins 112 are configured such that a portion of stored cards 306 and 308, extend above the fins. The transportation mechanisms 128A-B move, indicated as 310, between the opening 106 and the storage mechanism 110.

By way of example and not limitation, the rollers 302A-B and 304A-B engage the card 102 and advance the card into the main housing 104. The transportation mechanisms 128A-B then move towards the storage mechanism 110, where the rollers 302A-B and 304A-B advance the card 102 into the storage area 116D. To retrieve a stored card, such as the stored cards 306 and 308, the transportation mechanisms 128A-B move 310 towards the storage mechanism 110, where the rollers 302A-B and 304A-B can engage the stored cards. The transportation mechanisms 128A-B then move towards the opening 106, where the rollers 302A-B and 304A-B advance the stored cards through the opening and out of the card holder device 100.

According to one aspect, the transportation mechanism 128 includes a gripper device that grips or squeezes the card 102 along opposing edge surfaces of the card 102. For example, a pair of gripper arms engage the card 102 and maneuver the card 102 into and around the card holding device 100.

In another aspect, the gripper device grips the card 102 on opposing faces. In this aspect, the transportation mechanism 128 may more easily place the card 102 upon a shelf and/or platform for storage.

According to yet another aspect, the transportation mechanism 128 may be a receptacle that protrudes from the insertion opening 106 of the card holder device 100. For example, the receptacle may be a tray, drawer, or other container capable of receiving the card 102. The user places the card 102 into the receptacle which transports the card 102 through the insertion opening 106. In this example, the user places the card 102 into the receptacle then pushes the receptacle into the card holder device 100.

In another aspect, the receptacle is automated and motor-driven. In this aspect, the receptacle transports the card 102 into the card holder device 100 automatically upon detecting that the card 102 has been placed in the receptacle or in response to an input from the user.

Figure 4A:
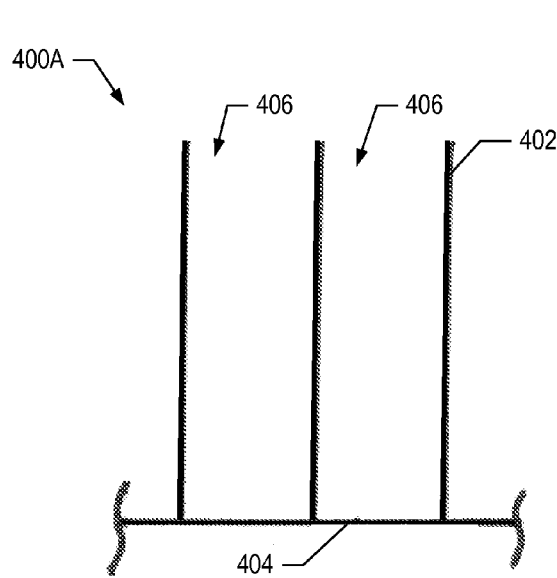
FIGS. 4A-D depict exemplary fins configurations of a storage mechanism for the card holder device.
Figure 4B:
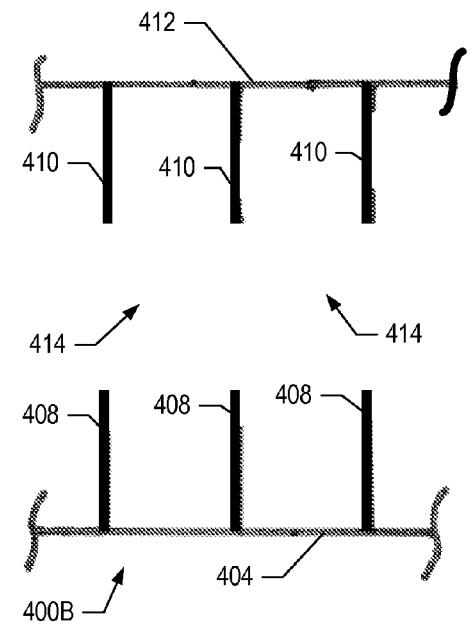

FIGS. 4A-B depict example arrangements of the fins 112 as incorporated into the storage mechanism 110 (see FIG. 2). Although examples are provided, it is contemplated that other configurations may be used.

FIG. 4A depicts an embodiment of the fin arrangement 400A as viewed from the side. According to one aspect, the fins 402 are attached to the surface of a disk 404. The fins 402 create storage areas 406 that may hold the card 102. In this aspect, the card 102 is stored in a vertical orientation between the fins 402.

FIG. 4B depicts another embodiment of the fin arrangement 400B as viewed from the side. According to one aspect, a set of fins 408 are attached to a first disk 404, while another set of fins 410 are attached to a second disk 412. In this aspect, the fins 408-410 create storage areas 414 that may hold a card 102 inserted by the transportation device 126. In this aspect, the card 102 is stored in a vertical orientation between a pairs of fins from the set of fins 408 and a pair of fins from the set of fins 410.

Figure 4C:
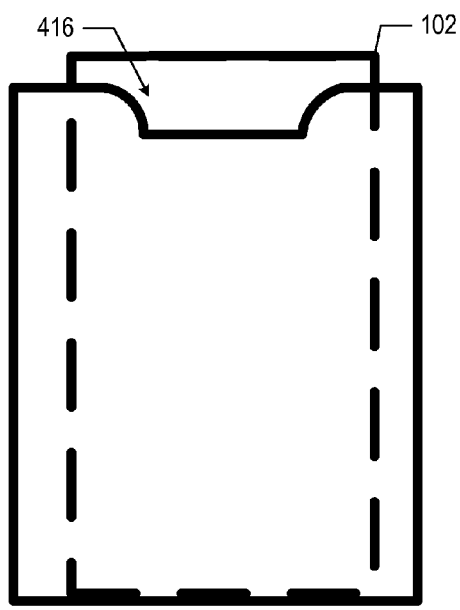
Figure 4D:
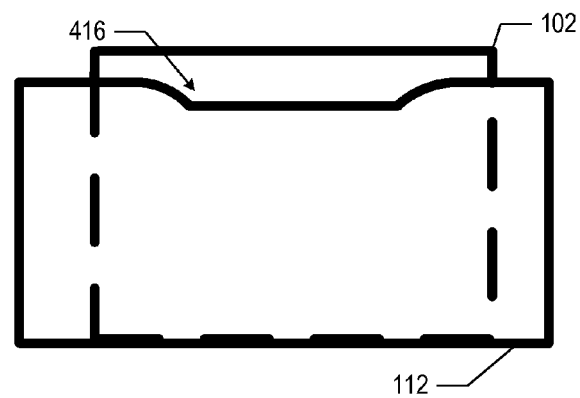

FIGS. 4C-D depict other embodiments of the fins 112. According to one aspect, the fins 112 have a notch or other cutout 416, so that a portion of the card 102 extends beyond the fins to be engaged by the transportation mechanism 128.

Figure 5:
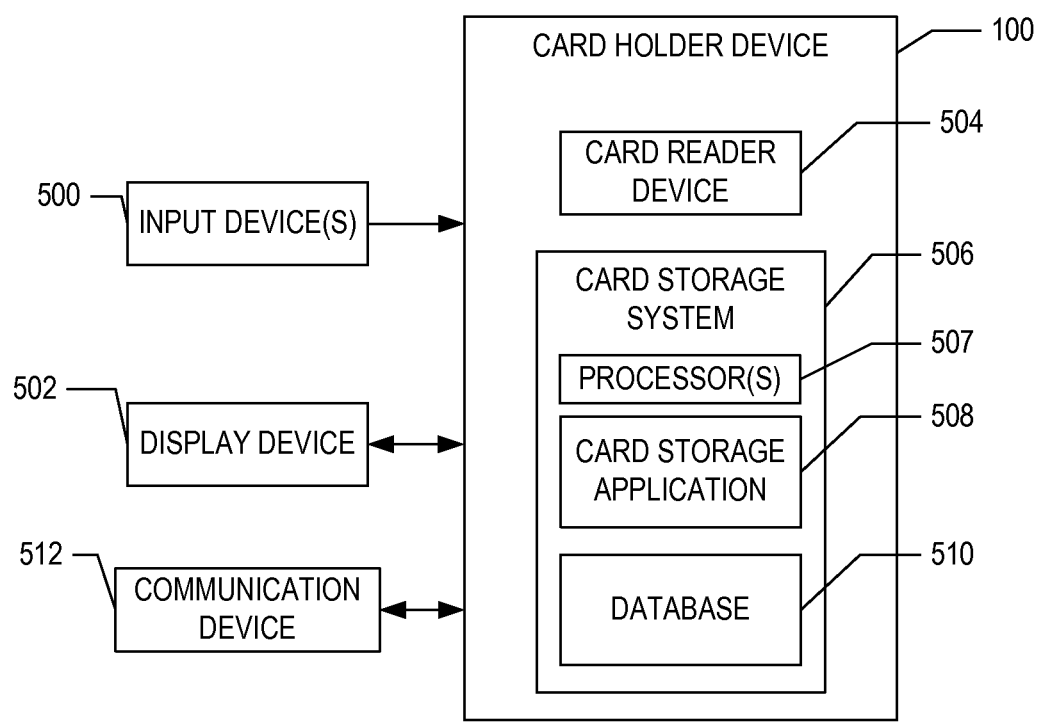
FIG. 5 depicts a block diagram of an aspect of the card holder device.

FIG. 5 depicts a block diagram of an embodiment of the card holder device 100. In this embodiment, the card holder device 100 includes an input device 500, a display device 502, a card reader device 504, and a card holder system 506.

The input device 500 may be a switch, button, keyboard, a touchpad, a touch screen, card reader, and/or a pointing device (e.g., a mouse, trackball, pen, or other like device). In one aspect, the input device 500 is configured for interacting with the card holder system 506, customizing the card holder system 506 to the user's requirements, and/or entering data into the card holder system 506. For example, the bartender may manually enter information about the patron or the card 102.

In one aspect, the input device 500 receives a storage request or a retrieval request to initiate the storage or retrieval, respectively, of the card 102. A storage request is a request to store a card 102 input into the card holder device. Conversely, a retrieval request, is a request to retrieve a card 102 stored within the card holder device 100. Other inputs and types of inputs may also be received.

According to one aspect, the storage request is generated when a user depresses a button and inputs data associated with the card 102, or inserts the card. In response to the storage request, the card holder device 100 may identify an empty storage area 116 to receive the card 102. In one aspect, the storage mechanism 110 rotates to position the empty storage area 116 near the opening 106 or 108. In another aspect, the transportation mechanism 128 may also be activated to aid in storing the card 102.

According to one aspect, the retrieval request is generated when a user depresses a button, inputs data associated with a card 102 stored in the card holder device 100, and/or retrieves data associated with a card stored in the device. In response to the retrieval request, the card holder device 100 identifies the storage area 116 where the desired card 102 is located. In one aspect, the storage mechanism 110 rotates to position the storage area 116 that contains the desired card 102 near the opening 106 or 108. In another aspect, the transportation mechanism 128 and/or the ejector device 124 may also be activated to aid in retrieving the card 102.

The display device 502 may be a monitor, television, or other video displaying device. According to one aspect, the display device 502 is a touch-screen device receives inputs from the user that are used to generate storage request and/or retrieval request. In another aspect, the display device 502 may be incorporated into the main housing 110 of the card holder device 100.

The card reader device 504 is an input device that reads information that has been encoded the card 102. For example, the card reader device 504 gathers information stored on a magnetic strip attached to the card 102. This information may be related to the cardholder's name. The cardholder's name may then be used for the identification and retrieval of the card 102 from the card holder device 100. In another example, the card reader device 504 and/or computing device communicate via a network with the card issuing entity. In this example, the card reader device 504 and/or card holder system 506 gather information that may be used for billing purposes or to establish a limit of available credit for the patron.

In another aspect, the card reader device 504 collects information from other storage media that may be associated with the card 102. For example, the card reader device 504 can collect information from a contactless card containing a microchip or from a card containing a Radio-Frequency Identification (RFID) tag.

According to yet another aspect, the card reader device 504 captures information that is printed on the card 102. For example, an image of a business card is captured as the business card is inserted into the device. In this example, the card reader device 504 includes a scanner or other photographic device. From the captured image, the information on the card 102 may be recognized and stored using character recognition techniques. In one aspect, the card reader device 504 and/or the card holder system may use optical character recognition (OCR) techniques to recognize the information printed on the card 102.

The card holder system 506 includes one or more processors 507 and volatile and/or nonvolatile memory and can be embodied in one or more distributed or integrated components or systems. The card holder system 506 may include computer readable media on which one or more algorithms, software applications, and/or firmware is loaded and/or operates to implement the methods and systems identified herein. The computer readable media may include volatile media, nonvolatile media, removable media, non-removable media, and/or other media or mediums that can be accessed by a general purpose or special purpose computing device. For example, computer readable media may include computer storage media and communication media. Computer storage media further may include volatile, nonvolatile, removable, and/or non-removable media implemented in a method or technology for storage of information, such as computer readable instructions, data structures, program modules, and/or other data. Communication media may, for example, embody computer readable instructions, data structures, program modules, algorithms, and/or other data, including as or in a modulated data signal. The communication media may include wired and wireless connections and technologies and be used to transmit and/or receive wired or wireless communications. Combinations and/or subcombinations of the above and systems and components described herein may be made.

According to one aspect, the card holder system 506 controls the operation of the card holding device 100 and its components. For example, the card holder system 506 controls the operation of the stepper motor 122, the ejector device 124, the transportation mechanism 128, and/or the card detecting mechanism (see FIG. 1). The computing device may also be used to control other components and other features of the card holder device 100.

In one aspect, the card holder system 506 includes a card storage application 508 that is executed by the one or more processors 507 to capture, organize, process, store, and display information associated with the patrons and/or cards stored in the card holder device 100. The executed card storage application 508 also generates a user interface that is displayed on the display device 502. The information organized, processed, and stored by the card storage application 508 may be stored temporarily or permanently in a database 510.

According to one aspect, the card holder device 100 is in communication with a communication device 512 to communicate via wireline and/or wireless communications, such as through the Internet, an intranet, an Ethernet network, a wireline network, a wireless network, and/or another communication network. By way of example and not limitation the communication device 512 may be a modem, router, gateway, network interface card, or other device. In various aspects, the communication device 512 is incorporated into the card holder device 100, and may reside within the main housing 104.

Figure 6:
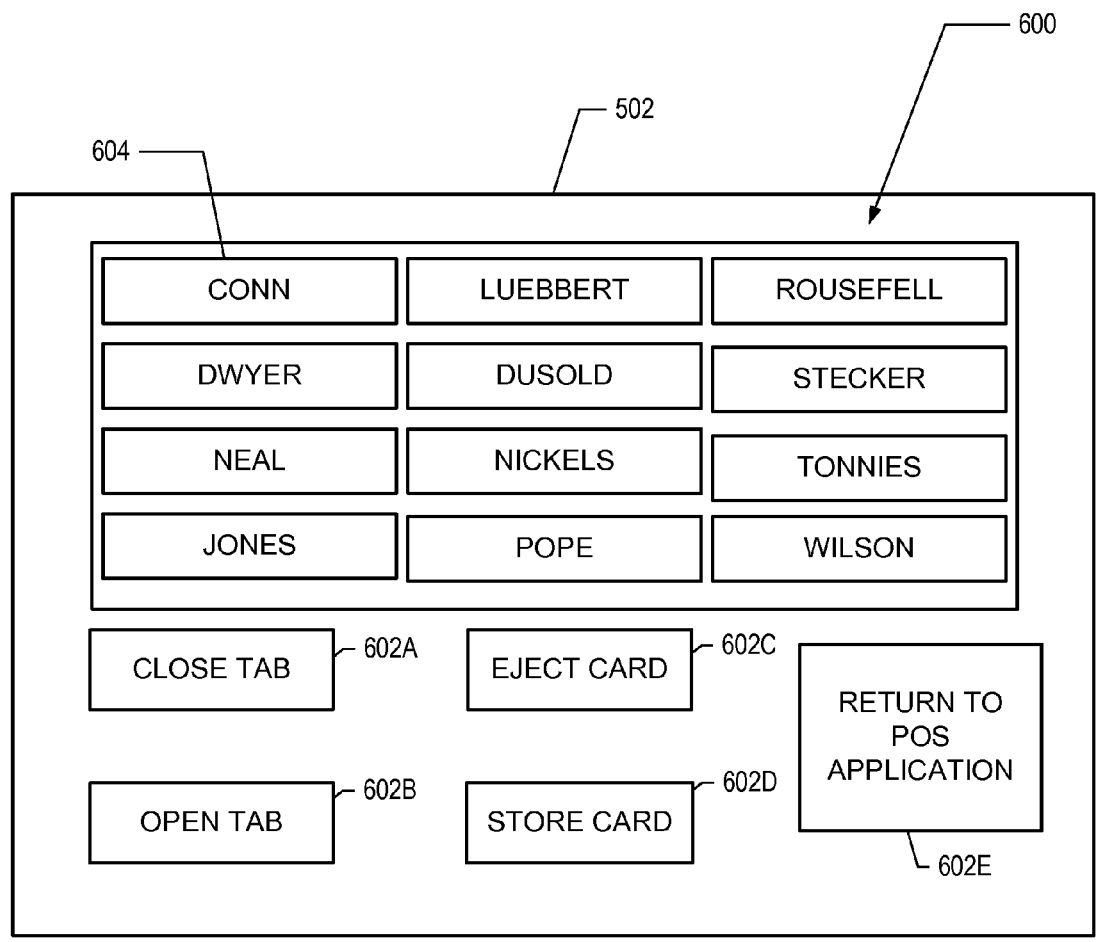
FIG. 6 is an example of a user interface for interacting with the card holder device.

FIG. 6 is an example of a user interface 600 for interacting with the card holder device 100. In one aspect, the user interface 600 is generated for display on the display device 502, by an embodiment of the card storage application 508. The user interface 600 allows the user of the card holder device 100 to identify and/or retrieve a card that is stored in the card holder device 100. For example, a bartender may interact with a number of virtual buttons 602A-E presented on the user interface 600 to identify patrons that still have a tab open and/or retrieve the card 102 for a patron who wishes to close their tab. In this example, the retrieval of the card 102 is initiated by an input from the bartender.

The bartender may touch a "Close Tab" virtual button 602A generated by the card storage application 510 that appears on a touch-screen display device, such as display device 502. After touching the "Close Tab" virtual button 602A, the bartender may be presented with a number of additional touch buttons 604 that correspond to a storage area, such as storage area 116A and/or name associated with the card 102 and/or the patron. Other combinations and/or subcombinations for the location and display of the virtual buttons described herein may be used.

By way of example, the bartender may touch one of the virtual buttons 604 to retrieve the card 102 for the patron Conn. In this example the card holder system 506 receives the input and controls the stepper motor 122 for the storage mechanism 110 so that the corresponding storage area, such as storage area 116A is aligned with the card retrieval opening 108. The computing device also controls the ejection mechanism 124, which causes the card 102 to be ejected from the storage area and the card holder device 100.

According to another aspect, the card storage application 510 is capable of communicating and/or integrating with a third-party business application. The business application may be an existing application used by the establishment to conduct transactions with the patrons (e.g. a restaurant Point-of-sale (POS) software). In this aspect, the card holder device 100 may function as a terminal or client device for an existing computing system or network. The card storage application 510 may be integrated with the POS software and facilitate transactions between the establishment and the patron. The card storage application 510 may communicate with the POS software or other software on one or more computing devices using communication media over a network including by not limited to a local access network (LAN), a wide area network (WAN), or the Internet.

According to yet another aspect, the card storage application 510 displays advertisements on the display device 502. The advertisements are customizable and may be incorporated into a screen-saver functionality of the card storage application 510. The advertisements may also be displayed in response to user input. For example, the card storage application 510 may display a slideshow of advertisements, logos, or other graphics for a particular establishment, distributor, and/or product line.

Although the card holder system 506 is illustrated as being incorporated into the card holder device 100, in other aspects the card holder system 506 is an external computing device that communicates with the card holder device 100 directly or via a network. In addition, a number of computing devices may be used, whether external to or incorporated into the card holder device 100.

Figure 7:
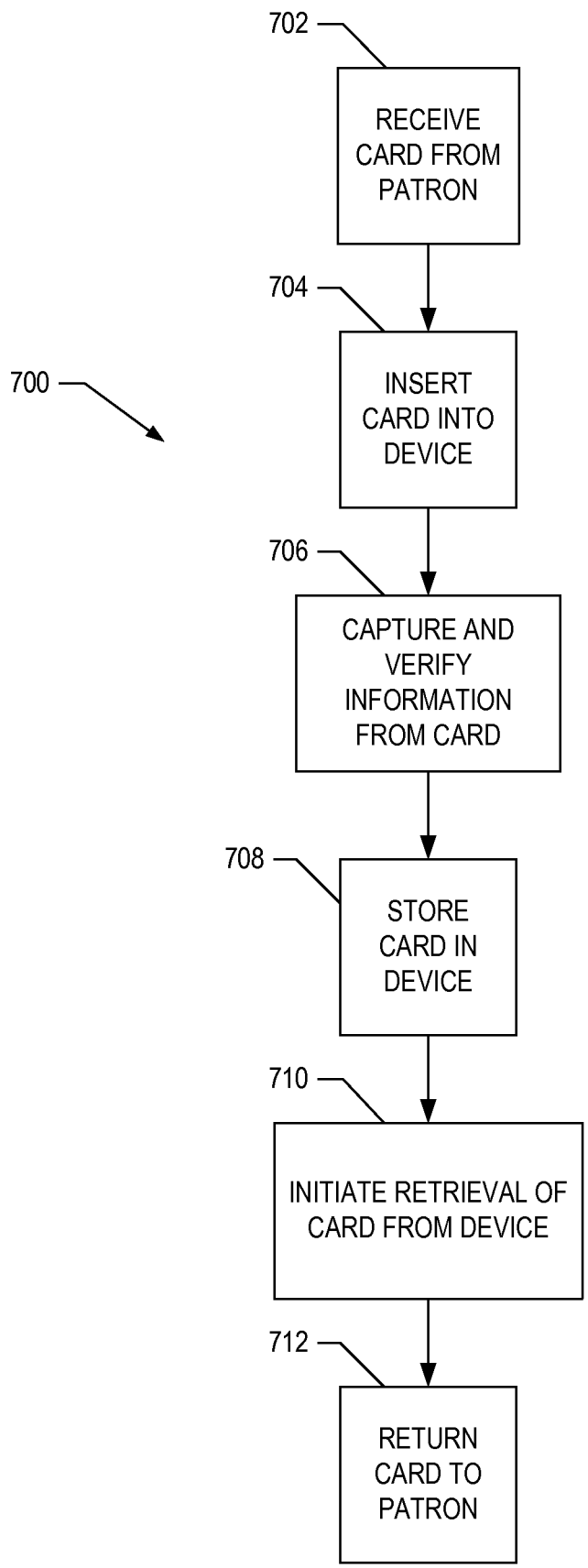
FIG. 7 is flow diagram illustrating a method to use the card holder device.

FIG. 7 is a flow diagram of a card storage and retrieval process 700 using the card holder device 100, such as the device depicted in FIG. 5. According to one aspect, a bartender determines that a patron wishes to open a tab and receives a card (e.g. the card 102) from a patron at block 702. At block 704, the bartender inserts the card 102 into the card holder device 100. Information encoded and/or printed on the card 102 is captured by the card reader device 504, verified, and associated with the card 102 by the card holder system 506 at block 706. In another aspect, the data can be captured by the card reader device 504 prior to inserting the card 102 into the card holder device 100.

After the card 102 has been read by the card reader device 504, the card 102 is transported by the transportation mechanism 128 and stored in the storage mechanism 110 at block 708. When the patron decides to close the tab or services are no longer available to the patron, the bartender initiates the retrieval of the card 102 from the card holder device 100 at block 710. To initiate retrieval, the bartender may press a first virtual button, generated by the card storage application 510, appearing on the touch-screen display device. During the retrieval of the card 102, the bartender may also interact with the establishments POS software to charge the patron for the services rendered. According to one aspect, the card holder system 506 provides billing information, captured by the card reader device 504 at block 706, to the POS software. In this aspect, the computing device expedites the process of closing the tab by negating the need to retrieve and then swipe the card 102 to receive payment from the patron.

In another aspect, the card 102 may retrieved from the card holder device 100, without providing billing information to the POS software. In this aspect, the patron may use the same card 102 or another form of payment may to close the tab. At block 712, the card 102 is returned to the patron.

The method described herein does not have to be executed in the order described, or in any particular order. Moreover, various activities described with respect to the method identified herein can be executed in serial or parallel fashion.

Figure 8:
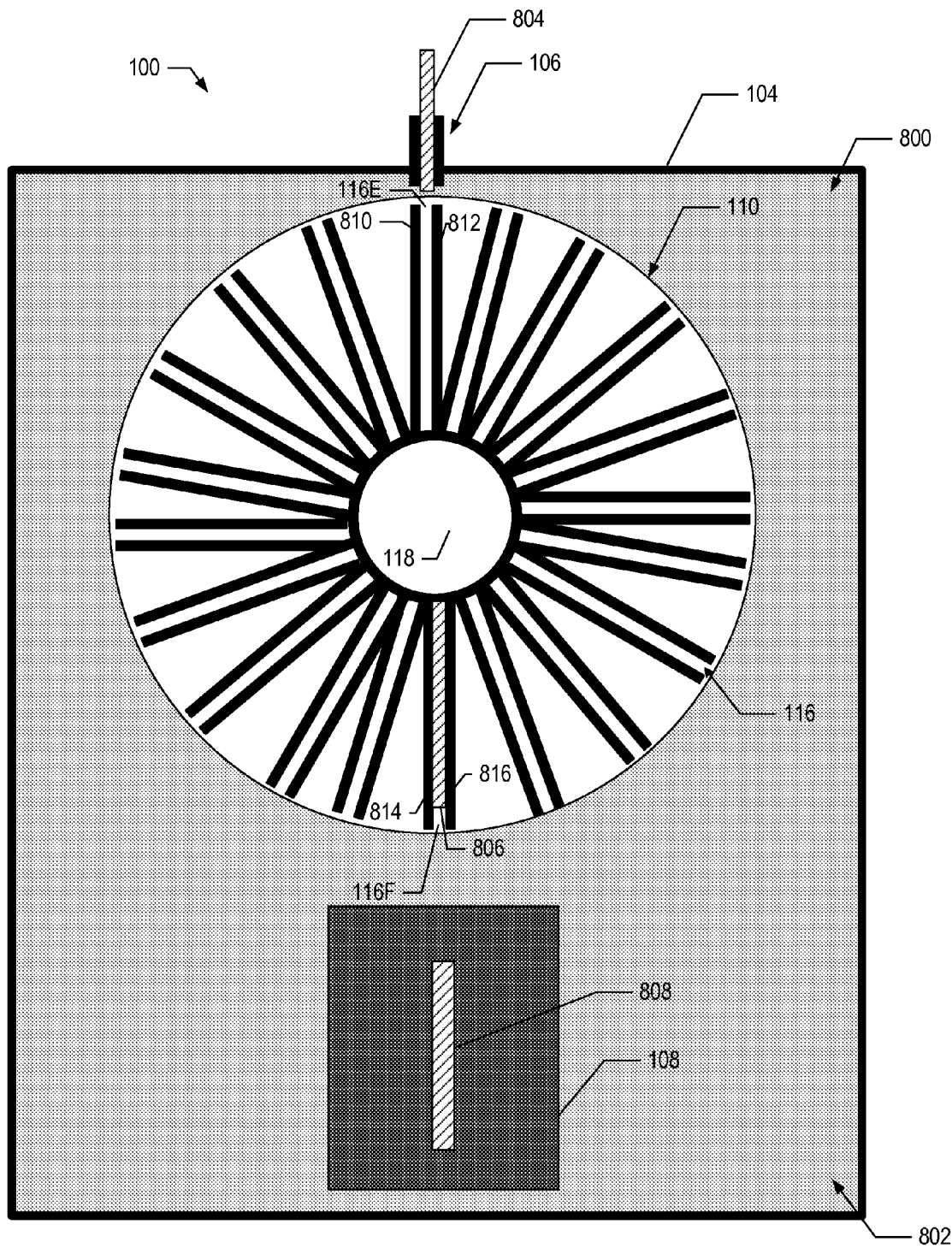
FIG. 8 depicts an aspect of the card holder device.
Figure 9:
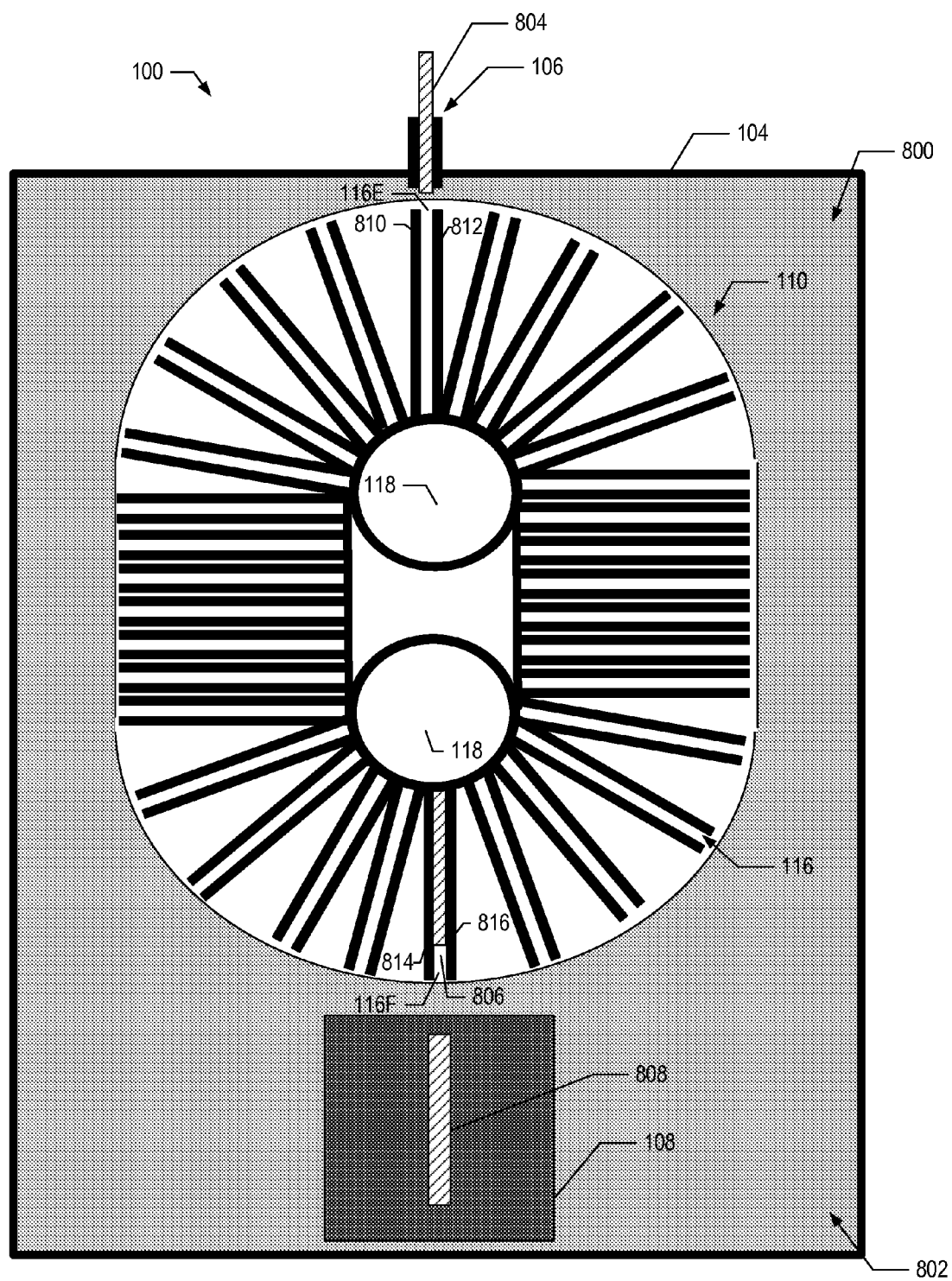
FIG. 9 depicts an aspect of the card holder device.
Figure 10:
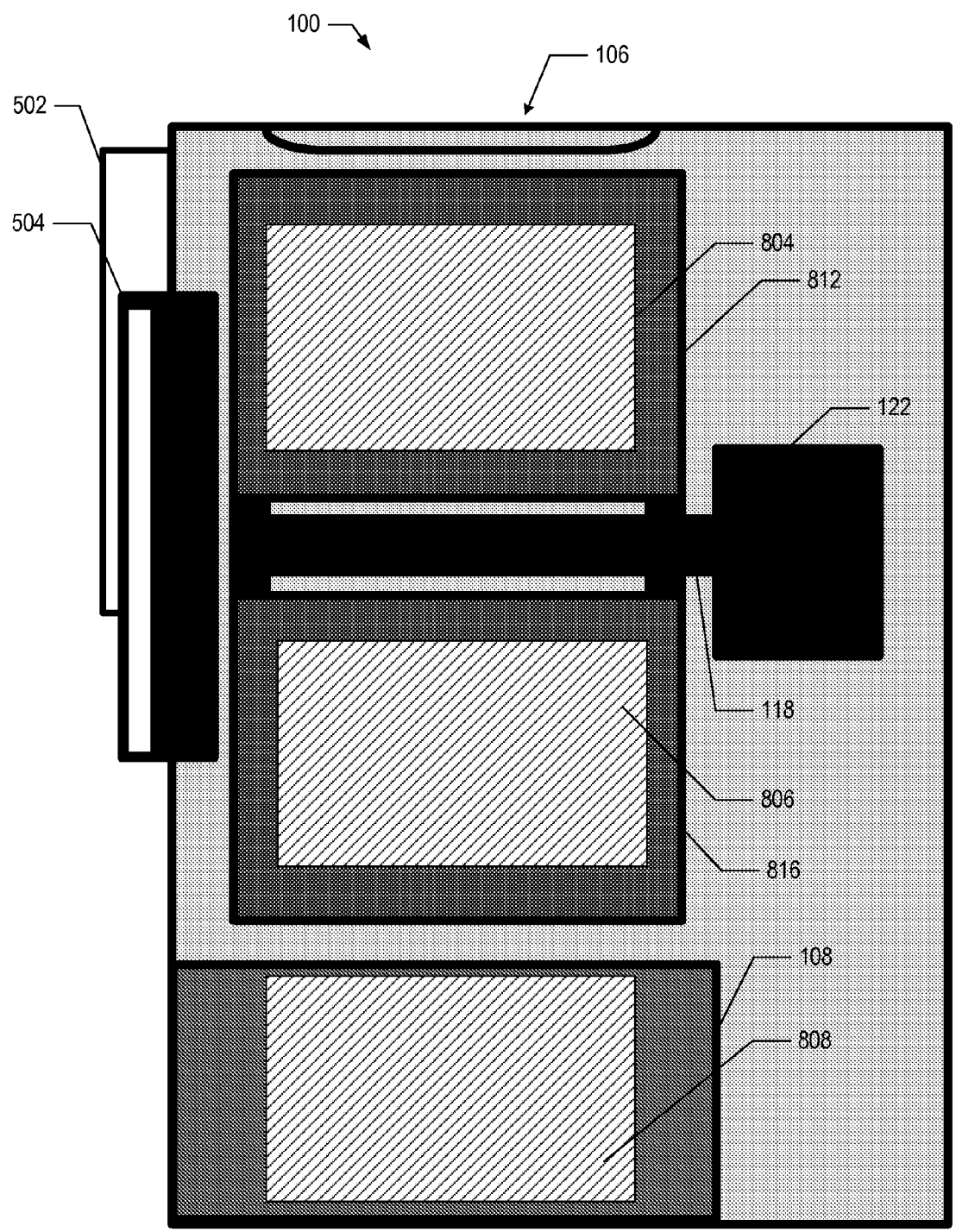
FIG. 10 depicts an aspect of the card holder device.

FIGS. 8-10 depict interior views of other embodiments of the card holder device 100. In one aspect, the storage mechanism 110 is oriented such that the hub 118 is substantially parallel to a top portion 800 and bottom portion 802 of the card holder device 100. The storage mechanism 110 may be generally circular in shape, as shown in FIG. 8 or generally oval in shape as shown in FIGS. 9-10.

In one aspect, the card holder device 100 does not include rely on transportation mechanism, such as the transportation mechanism 128, to maneuver the cards 804-808 (e.g. the card 102) into and/or out of the device. In this aspect, the insertion opening 106 is located on or near the top portion 800 of the main housing 104 and the force of gravity is used to maneuver the card 804 from the insertion opening 106 to a storage area 116, such as the storage area, 116E.

The retrieval opening 108 is located at or near the bottom portion 802 of the main housing 104. Similarly, the force of gravity may be used to maneuver the card 808 from the storage mechanism 110 to the retrieval opening 108. In one aspect, the force of gravity alone is used to move the card 804 to the storage mechanism 110 and to move the card 808 to the retrieval opening 108. In other aspects, gravity may used in conjunction with another device, including but not limited to the transportation mechanism 128, to move the cards 804-808 to and/or from the storage mechanism 110.

In another aspect, the storage areas 116, such as the storage areas 116E and 116F are defined by one or more gripper arms 810-816 to compress and hold the cards 804 and 808 within the storage mechanism 110. In this aspect, a pair of gripper arms 810-812 moves towards and away from one another as necessary, to compress and hold the card 804, respectively.

In another aspect, the storage areas, such as the storage area 116F, may be defined by one stationary gripper arm 814 and one movable gripper arm 816. In this aspect, the movable gripper arm 816 moves towards and away from the stationary arm 814, as necessary to grip and release, respectively, the card 806.

In one aspect, the corresponding pairs of gripper arms 810-812 and 814-816 are in a parallel orientation, such that to grip and release the cards 804 and 808, respectively, the gripper arms travel in a direction perpendicular to their longitudinal axes. In another aspect, the corresponding pairs of gripper arms 810-812 and 814-816 are hinged at or near the point where the gripper arms are attached to the hub 118. In yet another aspect, the corresponding pairs of gripper arms 810-812 and 814-816, are affixed to the surface of a disk with in the storage mechanism, such as the disk 404.

In various aspects, the gripper arms 810-816 may be opened and closed by any suitable means, including but not limited to a worm drive, a set of gears, one or more magnets, or a pivot and lever arrangement. Other orientations and/or devices may be used to grip the cards 804-808. In one aspect, the gripper arms 810-816 engage at least one of the cards 804-808 along its opposing faces.

In another aspect, as shown in FIG. 10, the card 800 has been received at the storage mechanism 110, and is held, at least in part by the gripper arm 812. As shown, the gripper arms 810-812 and 814-816 engage the cards 804 and 806, respectively, along the outer edge of their faces.

Figure 11A:
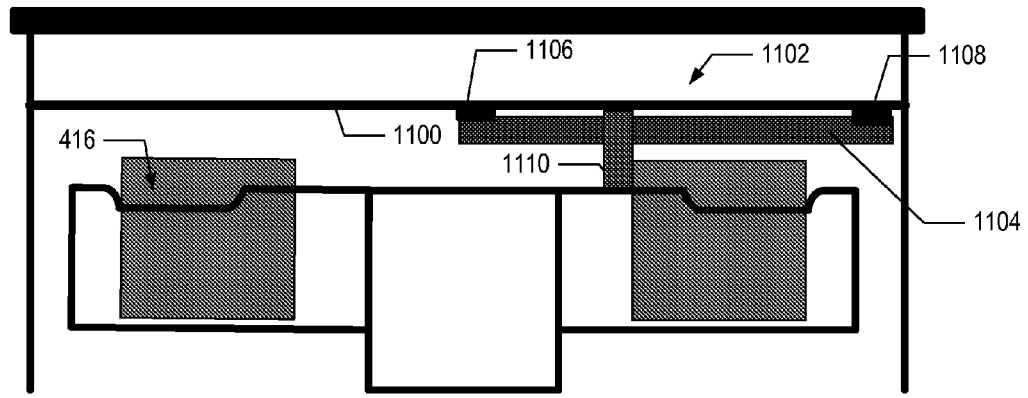
FIGS. 11A-B depict an aspect of the card holder device.
Figure 11B:
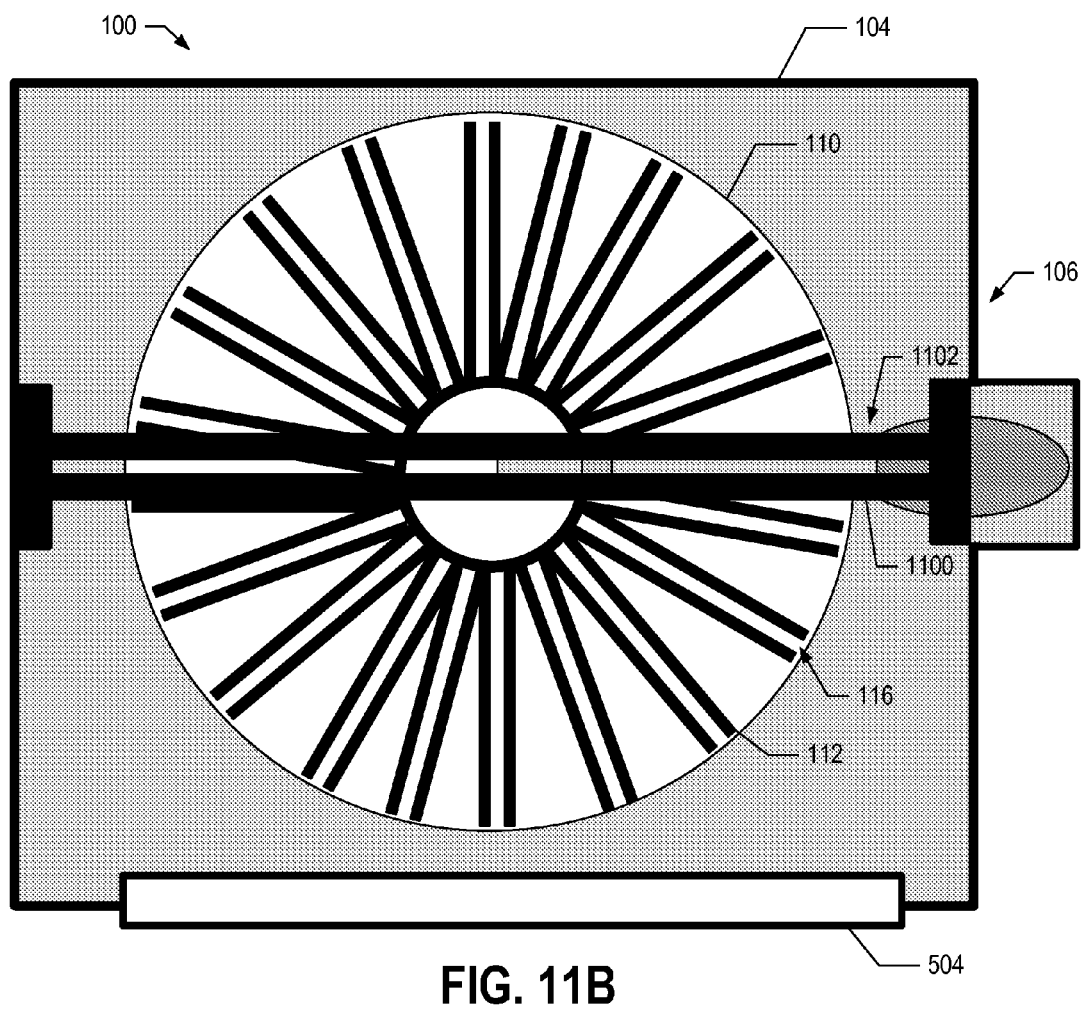

FIGS. 11A-B depict one embodiment of the ejector device 124. In one aspect, the ejector device 124 includes one or more support bars 1100. The support bar 1100 is attached to the main housing and extends the width of the main housing. The support bar 1100 aligns with a diameter of the storage mechanism and one or more storage areas 116.

In one aspect, the support bar 1100 supports a mechanical slide ejector 1102 that includes an ejector slide bar 1104. The ejector slide bar 1104 is attached to the support bar 1100 at a first connection 1106 approximately located over the hub 118 of the storage mechanism 1100. The ejector slide bar 1104 is also attached to the support bar 1100 at a second connection 1108 located at a position outside of the storage mechanism 110, such that the length of the ejector slide bar 1104 is equal to or greater than the radius of the storage mechanism.

An ejector 1110 is slidably engaged with the ejector slide bar 1104 and is configured to travel along the ejector slide bar and engage a card 1112 that is stored in the storage mechanism 110. Upon receiving a retrieval request, the storage mechanism rotates to align the appropriate storage area 116 with the opening 106. The ejector 1110 then travels from a point near the hub 118 along the ejector slide bar 1104, where it engages and pushes the card 1112 out of the storage mechanism and to the opening.

Those skilled in the art will appreciate that variations from the specific embodiments disclosed above are contemplated by the invention. The invention should not be restricted to the above embodiments, but should be measured by the following claims.

What is claimed is:

1. A card holder device comprising:
   a main housing, the main housing defining an opening to receive the at least one card;
   a storage mechanism having at least one storage area to store the at least one card, wherein the storage mechanism rotates about an axis perpendicular to a bottom surface of the main housing, wherein the at least one card is received in and retrieved from the storage mechanism along another axis perpendicular to the bottom surface of the main housing;
   a card reader device to acquire data from the at least one card; and
   a card holder system comprising:
      a processor;
      memory; and
      a card storage application executed by the processor to:
         communicate with the card reader device to store the data acquired from the at least one card stored in the storage area in the memory; and
         control operation of the storage mechanism for storage of the at least one card in response to a storage request; and
         control operation of the storage mechanism for retrieval of the at least one card in response to a retrieval request.

2. The device of claim 1 further comprising another opening in the main housing to retrieve the at least one card after storage, wherein the other opening is on a different surface of the card holder device.

3. The device of claim 1, wherein the at least one card is released from a transportation mechanism at the opening and falls into the storage mechanism, such that the card is maneuvered by gravity.

4. The device of claim 1, wherein the main housing is secured by a locking mechanism to prevent unauthorized access to the storage mechanism.

5. The device of claim 1, wherein the main housing is generally cylindrical.

6. The device of claim 1, wherein the card reading device acquires data from at least one of a magnetic strip, an RFID tag, a barcode, and text on the at least one card.

7. The device of claim 1 further comprising an input device to receive the storage request and the retrieval request.

8. The device of claim 1, further comprising a display device to display a user interface.

9. The device of claim 8, wherein the display device is incorporated into the main housing.

10. The device of claim 1, wherein the storage mechanism is a carousel and further comprises a motor to rotate the carousel.

11. The device of claim 10, wherein the storage mechanism further comprises two or more hubs, wherein the storage mechanism has a general oval racetrack shape, and each of the two or more hubs are positioned at a foci of the general oval racetrack shape.

12. The device of claim 1, wherein the storage area is defined by one or more elongated fins, each of the one or more elongated fins is affixed at a first end to a central hub and extends away from the central hub radially.

13. The card holder device of claim of claim 12, wherein a first edge of the card rests on a bottom surface of the storage mechanism and the elongated fins shield at least 50% of at least one face of the card.

14. The device of claim 1 further comprising:
   a communication device to communicate with a computing device.

15. The device of claim 1 further comprising:
   a transportation mechanism to:
      engage the at least one card received through the opening, where the transportation mechanism engages opposing surfaces of the at least one card to grip the card; and
      transport the at least one card between the opening and the storage mechanism.

16. The device of claim 1, wherein the transportation device further comprises one or more rollers to engage the at least one card.

17. The device of claim 1 further comprising:
   a card gripper device to remove the at least one card from the storage mechanism, wherein the card gripper engages at least one of a pair of opposing faces or opposing edges of the at least one card.

18. The device of claim 1, wherein the card holder application communicates with a computing device through a communication device.

19. The device of claim 1, wherein the card holder application generates at least one advertisement for display on a display device.

20. A card holder device comprising:
   a main housing defining an opening in a top surface of the main housing to receive at least one card inserted therein;
   a transportation mechanism comprising at least one roller to engage the at least one card received at the opening, wherein the transportation mechanism engages opposing surfaces of the at least one card to grip the at least one card to:
      advance the at least one card into the main housing in response to a storage request, wherein the at least one card is advanced into the main housing along a path parallel to an axis perpendicular to a bottom surface of the main housing; and
      advance the at least one card out of the main housing in response to a retrieval request, wherein the at least one card is advanced out of the main housing along the path parallel to the axis perpendicular to the bottom surface of the main housing;
   a storage mechanism having at least one storage area to receive the at least one card from the transportation mechanism and to store the at least one card in a particular storage area, wherein the storage mechanism rotates about the axis perpendicular to the bottom surface of the main housing;
   a card reader device to acquire data from the at least one card;
   a card holder system comprising:
      a processor;
      memory; and
      a card storage application executed by the processor to:
         communicate with the card reader device to store the data acquired from the at least one card in the memory, the data being further associated with the particular storage area;

control operation of the storage mechanism for storage of the at least one card in the particular storage area in response to the storage request; and control operation of the storage mechanism for retrieval of the at least one card from the particular storage area in response to the retrieval request.

* * * * *